April 28, 1953

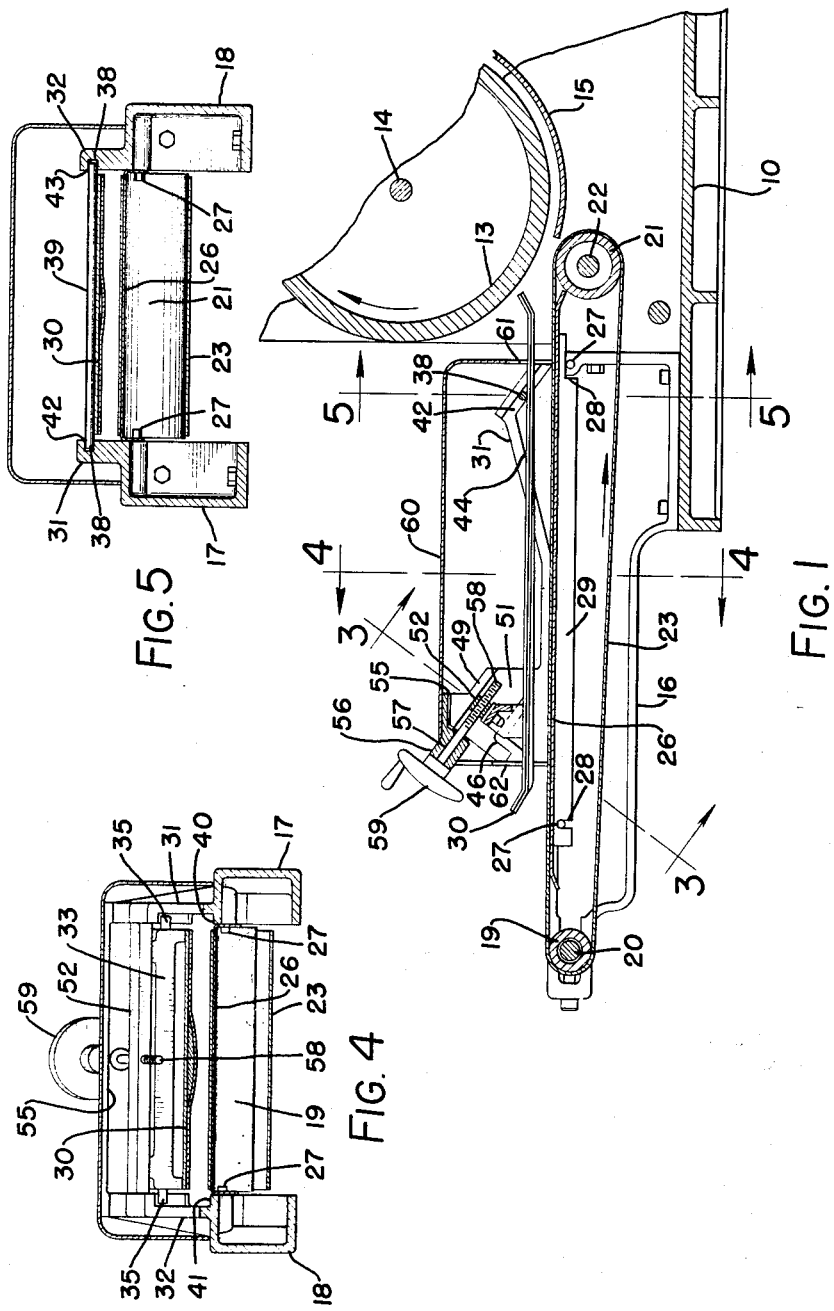

E. MARTIN 2,636,455

DOUGH MOLDER PRESSURE BOARD MOUNTING

Filed Dec. 5, 1950

INVENTOR.
EUGENE MARTIN
BY
Otto Moeller
Attorney

Patented Apr. 28, 1953

2,636,455

UNITED STATES PATENT OFFICE 2,636,455

DOUGH MOLDER PRESSURE BOARD MOUNTING

Eugene Martin, Wesleyville, Pa., assignor to Read Standard Corporation, a corporation of Delaware Application December 5, 1950, Serial No. 199,297

5 Claims. (Cl. 107—9)

My invention relates to dough moulding machines and more particularly to attachments therefor forming extensions of the kneading elements of such machines for forming, shaping or extending dough pieces after having been sheeted and coiled.

It is an object of my invention to provide novel and improved means for mounting and adjusting the pressure plate of such an extension unit toward and away from the conveyor that carries the coiled dough pieces under the pressure plate to vary the space therebetween and the pressure on the dough pieces; improved means of the type described whereby the pressure plate is firmly held in any adjusted position against accidental displacement; and improved means of the type described that permits of simple and convenient removal from and insertion in the extension unit of the pressure plate.

These and other objects and advantages of the invention are accomplished by the construction and arrangement of parts and will become apparent from the following description when read in connection with the accompanying drawings.

In the drawings:

Figure 1 is a fragmentary central longitudinal vertical section through a dough moulder with the extension unit constituting the invention applied thereto and shown in similar section;

Figure 4 is a sectional view taken on the line 4—4 of Figure 1; and

Figure 5 is a sectional view taken on the line 5—5 of Figure 1.

While the invention is applicable to various kinds of dough moulding machines, it is particularly adapted for use with a roll moulding machine of the type in which a ball or lump of dough is first rolled between cooperating driven rollers into a thin sheet, which is then coiled by suitable mechanism into a substantially cylindrically coiled loaf, and is thereafter subjected to a rolling and squeezing pressure between a rotating drum and an arcuate compression plate to knead or work the dough. For purpose of illustration, the invention is shown and described as applied to a moulder of this type, only so much of the moulder head being actually shown and described as is necessary for a complete understanding of the invention.

Figure 2:
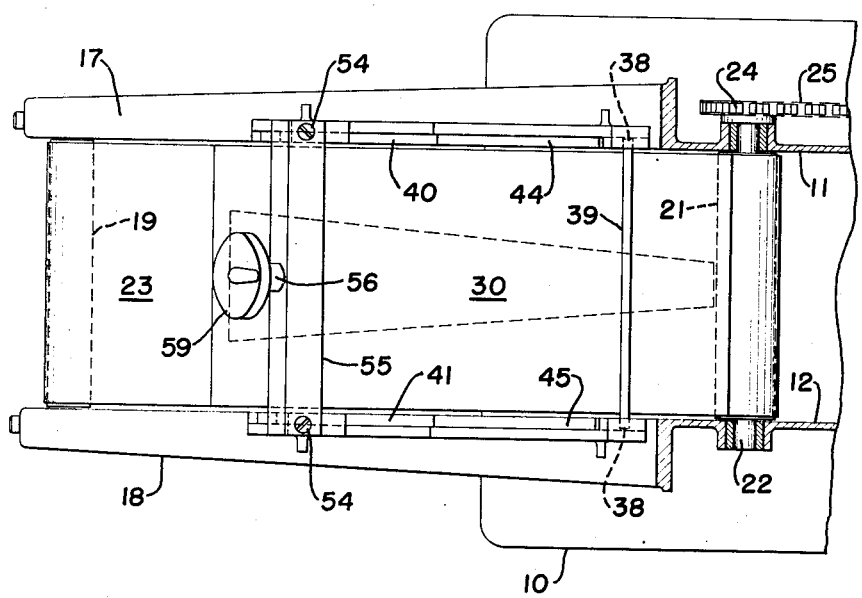
Figure 2 is a plan view of the extension unit with the cover removed and with parts of the moulder head broken away and shown in section.

Referring to the drawings, the numeral 10, Figures 1 and 2, designates the top frame member of a suitable base for the moulder. Extending upwardly from the base frame member 10 are a pair of longitudinally extending spaced parallel side frames 11 and 12 of the moulder head between which are mounted the usual sheeting rollers and curling roller (not shown).

A kneading drum 13 is mounted on a transverse shaft 14 which is journaled in the side frames 11 and 12. Suitable well known drive means is employed for rotating the drum 13 in the direction of the arrow on Figure 1. The drum 13 cooperates with an arcuate compression plate 15 spaced from the periphery of the drum to receive coiled dough pieces from the sheeting and curling rollers and to knead and roll them forwardly, discharging them to the forming, shaping or extending mechanism constituting the subject matter of this invention.

The forming, shaping or extending unit includes a frame 16 which is rigidly secured in any suitable manner on the base frame member 10 at the forward end thereof. The frame 16 includes transversely spaced parallel side frame members 17 and 18 extending forwardly from a position subjacent the moulder head.

The forward end of the frame 16 carries a pulley 19 which is mounted on a shaft 20 journaled in the side frame members 17 and 18. A second pulley 21 in substantial horizontal parallel alinement with pulley 19 is disposed rearward of the frame 16 subjacent the forward end of the compression plate 15 and is mounted on a shaft 22 journaled in the moulder head side frame members 11 and 12. An endless conveyor belt 23 extends about the pulleys 19 and 21 and is driven in the direction of the arrow in Figure 1 by the pulley 21. The means for rotating the pulley 21 includes a sprocket 24 mounted on a projecting portion of the pulley shaft 22 and over which sprocket is trained a sprocket chain 25 arranged to be driven in well known manner from the same source of power that operates the sheeting and curling rollers and drum 13 of the moulder head.

Below the upper run of the conveyor belt 23 is a backing or support plate 26 that extends transversely between the side frame members 17 and 18 and longitudinally from a position adjacent the periphery of the pulley 21 to a position near the pulley 19. The backing plate 26 is held in position in any suitable manner, as by means of longitudinally spaced pins 27 extending inwardly from the side frame members 17 and 18 which engage recesses 28, Figure 1, in the downturned side flanges 29 of the backing plate 26.

Mounted in spaced relation above the upper run of the conveyor belt 23 is a pressure board 30 forming between the belt 23 and pressure board 30 a channel for receiving the coiled dough pieces from the discharge end of drum 13 and compression plate 15, and through which channel the coiled dough pieces are conveyed by the conveyor belt 23. The rearward, or looking at Figure 1, the right end of the pressure board 30 is disposed adjacent the periphery of the drum 13 and is preferably slightly upturned to facilitate entrance of the coiled dough pieces into the channel and prevent rupturing of the skin of the dough pieces. The pressure board 30 cooperates with the backing plate 26 to apply pressure on the coiled dough piece as it is conveyed by the upper run of the conveyor belt 23 through the channel between the pressure board and backing plate. Depending on the conformation of the underside of the pressure board 30, the coiled dough piece may be formed, shaped or extended as desired.

The pressure board 30 is mounted for adjustment and removal or insertion in an improved and novel manner as will now be described.

Extending upwardly from and preferably integrally formed with the side frame members 17 and 18 are longitudinally extending side plates 31 and 32, respectively. The lengths of the side plates 31 and 32 are somewhat less than the length of the pressure board 30. The inner walls of the side plates 31 and 32 are provided with guides, as hereinafter described, cooperating with pins extending outwardly of the sides of the pressure board 30 for properly orienting the pressure board.

Figure 3:
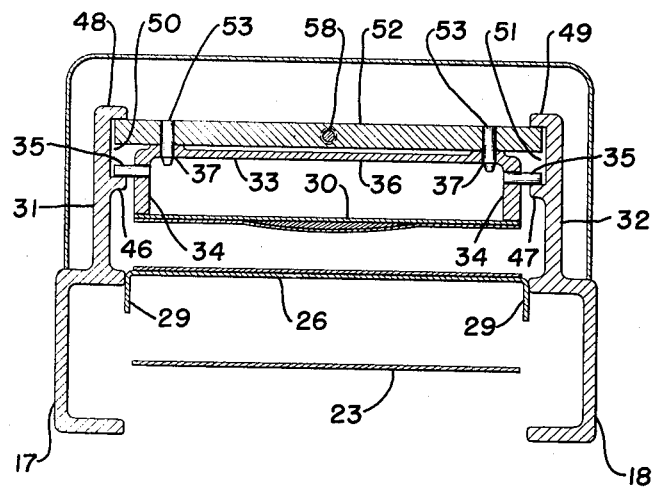
Figure 3 is a sectional view taken on the line 3—3 of Figure 1.

Mounted rigidly on the upper surface of the pressure board 30 near its forward end and extending the width thereof is an inverted U-shaped bracket 33. The upright end walls 34 of the bracket are provided with laterally extending pins 35 projecting beyond the sides of the pressure board 30, as best shown in Figure 3. The cross bar 36 connecting the upright end walls 34 of the bracket 33 is provided adjacent each end with an opening 37 extending therethrough, the purpose of which will be later described. The rearward portion of the pressure board 30 is provided with laterally projecting pins 38, which pins 38 may conveniently be merely extensions of a rod 39 extending transversely across and secured to the upper surface of the pressure board 30, as best shown in Figure 5.

The inside surfaces of the longitudinally extending side plates 31 and 32 are respectively provided at their rearward ends with downwardly and rearwardly sloping grooves 42 and 43 adapted to receive the pins 38 of the pressure board 30. Forward of the grooves 42 and 43, the inside surfaces of the plates 31 and 32 are recessed to provide ledges 40 and 41, Figures 2 and 4, having portions 44 and 45, Figures 1 and 2, sloping gradually upward to the upper ends of the grooves 42 and 43. The ledges 44 and 45 provide means for guiding the pins 38 into the grooves 42 and 43 when sliding the pressure board into position.

At their forward ends, the side plates 31 and 32 are provided on their inside surfaces intermediate their upper and lower edges with inverted V-shaped ledges 46 and 47, respectively, Figures 1 and 3. The rear legs of the inverted V-shaped ledges 46 and 47 are sloped at substantially the same angle as the grooves 42 and 43 and form a guide or track for the pins 35 of the pressure board 30. The upper forward edges of the side plates 31 and 32 are provided with inturned flanges 48 and 49, respectively, which are parallel with the rear legs of the ledges 46 and 47 to form therebetween the channels or guideways 50 and 51, and in which channels are received the pins 35 and a portion of the pressure board adjusting means, all as best shown in Figures 1 and 3.

The pressure board adjusting means includes a transversely extending bar 52 resting on the cross bar 36 of the pressure board bracket 33, and the ends of which bar 52 extend into the guideways 50 and 51. The adjusting bar 52 is provided with a pair of transversely spaced depending pins 53 which are arranged to engage in the openings 37 of the pressure board bracket 33, thereby maintaining the adjusting bar 52 and the pressure board 30 in operative engagement when the ends of the adjusting bar 52 and the pressure board pins 35 are disposed in the guideways 50 and 51.

Extending across the upper forward ends of the side plates 31 and 32 and secured thereto by suitable means, as by the countersunk screws 54 is a bracket 55 for supporting the pressure board adjusting means. The bracket 55 is provided midway between its ends with a boss 56 having a bore 57 extending therethrough. Projecting through the bore 57 is an adjusting stem 58, on the outer projecting end of which is secured an adjusting knob 59. The inner projecting end of the stem 58 is threaded in the adjusting bar 52.

From the above description it is evident that when the adjusting knob 59 is turned in one direction, engagement of the threaded stem 58 in the adjusting bar 52 will cause the latter to ride downwardly and rearwardly in the guideways 50 and 51. Since the pressure board bracket 33 is operatively connected with the adjusting bar 52 through the pins 53, and since engagement of the bracket pins 35 with the downwardly and rearwardly sloping legs of the inverted V-shaped ledges 46 and 47 prevent disengagement of the bracket 33 from the adjusting bar 52, it is apparent that the forward end of the pressure board will move rearwardly and downwardly closer toward the upper run of the conveyor belt 23. The same movement will, of course, be imparted to the rearward end of the pressure board 30 by reason of the engagement of the pins 38 in the grooves 42 and 43. When the adjusting knob 59 is turned in the opposite direction, the pressure board 30 will be moved forwardly and upwardly away from the upper run of conveyor belt 23.

Thus the depth of the channel between the pressure board 30 and the upper run of the conveyor belt 23 may be adjusted to obtain any desired pressure on any of various sized coils of dough pieces.

In order to remove the pressure board 30 for purpose of cleaning or repair, the adjusting knob 59 is turned in a direction to move the pressure board upwardly and forwardly until the pins 35 pass over the crests of the inverted V-shaped ledges 46 and 47, and the pins 38 are disengaged from the grooves 42 and 43. The pressure board 30 is then free to drop downwardly and forwardly, guided at its forward end by engagement of the pins 35 with the downwardly and forwardly sloping leg of the inverted V-shaped ledges 46 and 47, and guided at its rearward end by engagement of the pins 38 with the sloping ledge portions 44 and 45.

As the forward end of the pressure board 30 drops and moves forward, it will be seen that the pressure board bracket 33 is disengaged from the pins 37 of the adjusting bar 52 of the pressure board adjusting means. The pressure board 30 can then be drawn forwardly and removed without disturbing any portion of the adjusting means. In drawing the pressure board forwardly, the pins 38 at the rearward end of the board will pass beneath the inverted V-shaped ledges 46 and 47.

A cover 60 is preferably provided over the pressure board 30, and an opening 61 in the rearward end of the cover 60 permits a portion of the pressure board to extend therethrough. An opening 62 in the forward end of the cover 60 permits insertion and removal of the pressure board 30 without disturbing the cover 60.

I claim:

1. An adjustable mounting for the pressure board of a dough moulding machine, including longitudinally extending upright support plates at the sides of the pressure board, said plates being provided on their inner surfaces with similar sloping grooves and said pressure board being provided with laterally extending pin means to slidably engage said grooves, said upright support plates being also provided with inclined guides communicating at their upper ends with the upper ends of said grooves for guiding said pressure board pin means into said grooves upon endwise insertion of said pressure board, a rotatable stem carried by said support plates, said stem having a threaded portion, and means threaded on said threaded stem portion and engaging said pressure board for adjusting the position of the pressure board upon rotation of said stem.

2. An adjustable mounting for the pressure board of a dough moulding machine, including longitudinally extending upright support plates at opposite sides of the pressure board, said plates being provided on the inner surfaces with fore and aft longitudinally spaced similarly sloping grooves, said pressure board being provided with lateral fore and aft longitudinal spaced projections slidably engaging said respective fore and aft sloping grooves, said upright support plates being also provided with fore and aft inclined guides communicating at their upper ends with the upper ends, respectively, of said fore and aft grooves for guiding said pressure board projections into said grooves upon endwise insertion of said pressure board, a rotatable stem carried by said support plates, said stem having a threaded portion, and means threaded on said threaded stem and engaging said pressure board for adjusting the position of the pressure board upon rotation of said stem.

3. In a dough moulding machine, a traveling belt for conveying coiled rolls of dough, a pressure board above said belt forming therebetween a moulding channel for the conveyed rolls of dough, longitudinally extending upright pressure board support plates at the sides of said moulding channel, said plates being provided on their inner surfaces with similarly sloping opposed pairs of longitudinally spaced grooves and said pressure board being provided with lateral projections to slidably engage said grooves, said plates being also provided on their inner surfaces with longitudinal support guides extending from the upper ends of one pair of opposed sloping grooves toward and beneath the other pair of opposed sloping grooves, said guides being engaged by the lateral projections at one end of said pressure board for supporting the same above said belt upon endwise insertion and removal of said pressure board into position between said longitudinally spaced pairs of sloping grooves.

4. A construction according to claim 3 including means carried by said support plates and engaging said pressure board, said means being operative for moving said pressure board to and retaining it in any one of a number of positions along said grooves for adjusting the vertical extent of said moulding channel.

5. An adjustable mounting for the pressure board of a dough moulding machine, including longitudinally extending upright support plates at opposite sides of the pressure board, said plates being provided on their inner surfaces adjacent the opposite ends of said plates with pairs of similarly sloping grooves, pin means extending laterally of said pressure board for slidably engaging the grooves at one end of said plates, pin means extending laterally of said pressure board and a cross bar extending transversely across and detachably connected with said pressure board above said last named pin means, the ends of said cross bar and said last named pin means slidably engaging the grooves at the other end of said plates, a rotatable stem carried by said support plates, said stem having a threaded portion threaded in said cross bar for moving said bar and said pressure board to different positions of adjustment along said grooves upon rotation of said stem.

EUGENE MARTIN.

References Cited in the file of this patent

UNITED STATES PATENTS

| Number | Name | Date |
| --- | --- | --- |
| Re. 18,545 | Sternberg | July 26, 1932 |
| 1,534,617 | Streich | Apr. 21, 1925 |

FOREIGN PATENTS

| Number | Country | Date |
| --- | --- | --- |
| 171,526 | Great Britain | Nov. 24, 1921 |